US012785103B2

(12) United States Patent
Kim et al.

(10) Patent No.: US 12,785,103 B2
(45) Date of Patent: Nov. 3, 2026

(54) ELECTRODE FOR LITHIUM SECONDARY BATTERY COMPRISING INSULATING LAYER, AND METHOD FOR MANUFACTURING SAME

(71) Applicant: LG ENERGY SOLUTION, LTD., Seoul (KR)

(72) Inventors: In Gu Kim, Daejeon (KR); Byeong Won Lee, Daejeon (KR); Jae Man Hwang, Daejeon (KR); Ho Jun Choi, Daejeon (KR)

(73) Assignee: LG Energy Solution, LTD., Seoul (KR)

( * ) Notice: Subject to any disclaimer, the term of this patent is extended or adjusted under 35 U.S.C. 154(b) by 515 days.

(21) Appl. No.: 18/274,982

(22) PCT Filed: Nov. 23, 2022

(86) PCT No.: PCT/KR2022/018559
§ 371 (c)(1),
(2) Date: Jul. 28, 2023

(87) PCT Pub. No.: WO2023/096322
PCT Pub. Date: Jun. 1, 2023

(65) Prior Publication Data

US 2024/0105954 A1 Mar. 28, 2024

(30) Foreign Application Priority Data

Nov. 23, 2021 (KR) ........................ 10-2021-0162675

(51) Int. Cl.
*H01M 4/62* (2006.01)
*H01M 4/02* (2006.01)
(Continued)

(52) U.S. Cl.
CPC ......... *H01M 4/623* (2013.01); *H01M 4/0416* (2013.01); *H01M 4/364* (2013.01);
(Continued)

(58) Field of Classification Search
CPC ...................... H01M 50/586; H01M 4/62–623
See application file for complete search history.

(56) References Cited

U.S. PATENT DOCUMENTS

2016/0043373 A1 2/2016 Arishima et al.
2020/0200163 A1 6/2020 Funasaka et al.
(Continued)

FOREIGN PATENT DOCUMENTS

CN 105190952 A 12/2015
CN 106063020 A 10/2016
(Continued)

OTHER PUBLICATIONS

Extended European search report dated Jul. 2, 2025 issued in European Patent Application No. 22899004.0.
(Continued)

*Primary Examiner* — Christine S. Kim
*Assistant Examiner* — Cole Leon Lindsey
(74) *Attorney, Agent, or Firm* — Morgan, Lewis & Bockius LLP

(57) ABSTRACT

Disclosed herein relates to an electrode for a lithium secondary battery including an insulating layer. The insulating layer is formed on a first insulating layer containing a first binder and on the first insulating layer, and includes a second insulating layer containing inorganic particles and a second binder, wherein the first binder is PVDF (Polyvinylidene fluoride), and the second binder is SBR (styrene butadiene rubber).

Accordingly, the insulating layer of the present invention is excellent in wetness adhesion and electrical safety.

16 Claims, 1 Drawing Sheet

(51) Int. Cl.

| | |
|---|---|
| ***H01M 4/04*** | (2006.01) |
| ***H01M 4/36*** | (2006.01) |
| ***H01M 10/052*** | (2010.01) |
| ***H01M 10/42*** | (2006.01) |
| ***H01M 50/586*** | (2021.01) |

(52) U.S. Cl.

CPC ..... *H01M 10/052* (2013.01); *H01M 10/4235* (2013.01); *H01M 50/586* (2021.01); *H01M 2004/027* (2013.01); *H01M 2004/028* (2013.01)

(56) References Cited

U.S. PATENT DOCUMENTS

| | | | | |
|---|---|---|---|---|
| 2020/0220163 | A1 | 7/2020 | Li et al. | |
| 2021/0159505 | A1 * | 5/2021 | Kato | H01M 10/0431 |
| 2021/0194007 | A1 * | 6/2021 | Danno | H01G 11/28 |

FOREIGN PATENT DOCUMENTS

| | | | | |
|---|---|---|---|---|
| CN | 111416103 | A | 7/2020 | |
| CN | 112864546 | A | 5/2021 | |
| JP | 2011-076836 | A | 4/2011 | |
| JP | 6033876 | B2 | 11/2016 | |
| JP | 6307594 | B2 | 4/2018 | |
| JP | 2019-075202 | A | 5/2019 | |
| JP | WO2019/111597 | A1 | 11/2020 | |
| JP | 2021-86681 | A | 6/2021 | |
| JP | 2021-157886 | A | 10/2021 | |
| KR | 10-2012-0062333 | A | 6/2012 | |
| KR | 10-2015-0045786 | A | 4/2015 | |
| KR | 10-2015-0046552 | A | 4/2015 | |
| KR | 10-1586530 | B1 | 1/2016 | |
| KR | 10-2019-0083625 | A | 7/2019 | |
| KR | 10-2019-0093522 | A | 8/2019 | |
| WO | WO-2015156213 | A1 * | 10/2015 | H01M 4/139 |
| WO | 2020/162598 | A1 | 8/2020 | |

OTHER PUBLICATIONS

Office Action dated Aug. 5, 2024 issued in Japanese Patent Application No. 2023-544742.

International Search Report (with translation) and Written Opinion dated Feb. 28, 2023 issued in corresponding International Patent Application No. PCT/KR2022/018559.

Office Action of May 9, 2025 issued in the counterpart Korean Patent Application No. 10-2022-0158274 (with machine translation).

Office Action dated May 19, 2026 issued in the corresponding Chinese Patent Application No. 202280011324.8.

* cited by examiner

[FIG. 1]
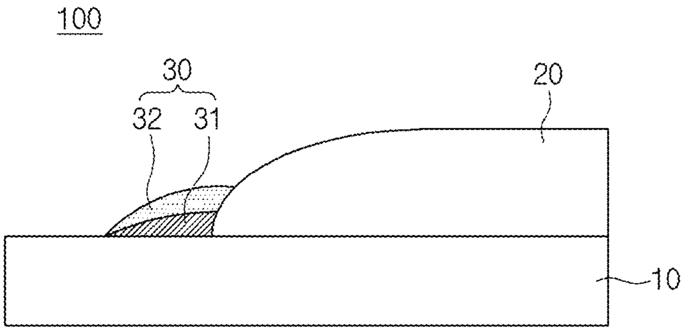
[FIG. 2]
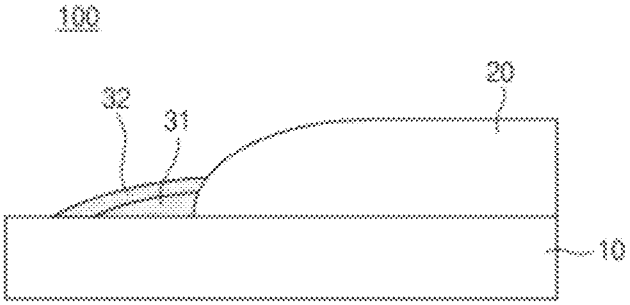
[FIG. 3]
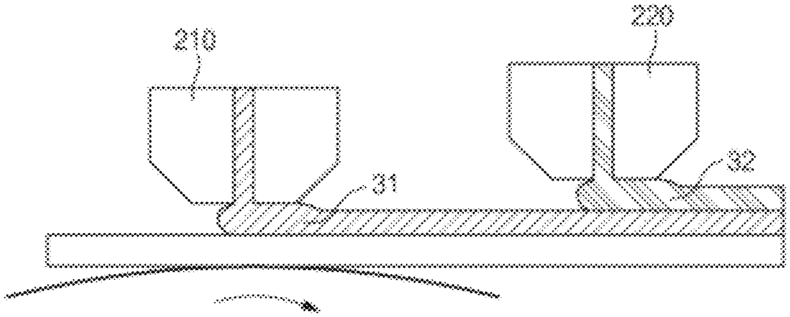
[FIG. 4]
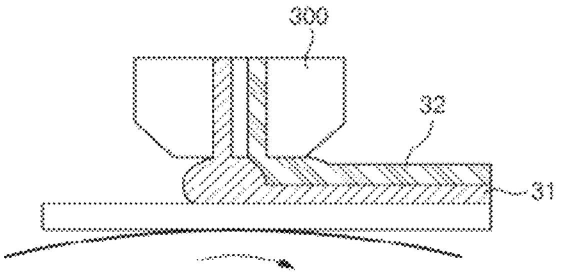

ELECTRODE FOR LITHIUM SECONDARY BATTERY COMPRISING INSULATING LAYER, AND METHOD FOR MANUFACTURING SAME

TECHNICAL FIELD

This application claims the benefit of priority based on Korean Patent Application No. 10-2021-0162675 filed on Nov. 23, 2021.

The present invention relates to an electrode for a lithium secondary battery including an insulating layer with a multilayer structure having an excellent wetness adhesion, an excellent coating property, and an electrical safety, and a manufacturing method thereof.

BACKGROUND TECHNOLOGY OF THE INVENTION

As technology development and demand for mobile devices increase, the demand for the secondary battery as an energy source is rapidly increasing, and accordingly, a lot of research is conducted on batteries that can meet various needs.

Representatively, in terms of the battery shape, there is a high demand for prismatic batteries and pouch-type batteries that can be applied to products such as mobile phones with thin thickness, and in terms of materials, there is a high demand for lithium secondary batteries such as lithium cobalt polymer batteries with high energy density, high discharge voltage, and output stability.

One of the main research projects in these secondary batteries is to improve safety. A major cause of accidents related to battery safety results from an abnormally high temperature state due to a short circuit between a positive electrode and a negative electrode. That is, under normal circumstances, a separator between the positive electrode and the negative electrode is positioned to maintain electrical insulation, but in abnormal situations such as battery overcharge or over-discharge, dendritic growth of the electrode material, or an internal short circuit caused by foreign substances, or excessive deformation is applied due to an external force such as a nail or a screw penetrating a battery, etc., the existing separators have limitations.

In general, a microporous membrane made of polyolefin-based resin is mainly used as a separator, but its heat resistant temperature is about 120 to 60° C., which is insufficient in terms of heat resistance. Therefore, when an internal short circuit occurs, there is a problem in that the separator shrinks due to the short circuit reaction heat, and the short circuit area expands, leading to a thermal runway state in which a greater amount of reaction heat is generated. When stacking electrodes, such phenomenon usually occurs at the end of electrode current collector applied with an electrode active material, and various methods have been tried to reduce the possibility of an electrode active material being short-circuited under an external impact or in a high temperature.

Specifically, in order to solve the internal short circuit of the battery, a method of forming an insulating layer by attaching an insulating tape to the non-coated part of the electrode and a part of the mixture layer or applying an insulating liquid for forming the insulating layer has been proposed. For example, there is a method of applying a binder for insulation purposes to the non-coated part of the positive electrode and to a part of the positive electrode mixture layer, or applying an insulating liquid for forming an insulating layer in which a mixture of the binder and inorganic particles is dispersed in a solvent.

Such insulating liquid for forming the insulating layer includes inorganic particles and a coloring agent in a polyvinylidene fluoride (PVDF) binder, and conventionally, the insulating liquid for forming the insulating layer has been applied in a single layer to form an insulating layer. The insulating layer including the PVDF-based binder has an excellent electrical safety and coating processability, but when wet with the electrolyte, the adhesive strength is lowered, and the insulating layer may be deintercalated from the current collector or the electrode mixture layer, and this becomes an impediment for the safety of the battery.

Therefore, it is necessary to develop n a technology for an electrode including an insulating layer having an excellent electrical safety as well as an excellent wetness adhesion.

DESCRIPTION OF THE INVENTION

Technical Problem

The present invention is to solve the problems of the prior art, and it is directed to provide an electrode for a lithium secondary battery including an insulating layer having an excellent adhesion to a current collector and an electrode mixture layer as well as an excellent electrical safety.

TECHNICAL SOLUTION

An electrode for a lithium secondary battery according to the present invention includes: a current collector; an electrode mixture layer formed on one side or both sides of the current collector; and an insulating layer, wherein the insulating layer includes a first insulating layer including a first binder and a second insulating layer formed on the first insulating layer and including inorganic particles and a second binder, wherein the first binder is PVDF (Polyvinylidene fluoride), and the second binder is SBR (styrene butadiene rubber).

In an exemplary embodiment of the present invention, the current collector may include a non-coated part on which the electrode mixture layer is not formed, and the first insulating layer may cover from a part of the non-coated part to a part of the electrode mixture layer.

In an exemplary embodiment of the present invention, the second insulating layer may cover from a part of the non-coated part to a part of the electrode mixture layer.

In an exemplary embodiment of the present invention, the surface of the first insulating layer may be completely covered by the second insulating layer.

In an exemplary embodiment of the present invention, the inorganic particles may be one or two or more mixtures selected from the group consisting of AlOOH, $Al_2O_3$, γ-AlOOH, $Al(OH)_3$, $Mg(OH)_2$, $Ti(OH)_4$, $TiO_2$, MgO, CaO, $Cr_2O_3$, $MnO_2$, $Fe_2O_3$, $CoO_4$, NiO, $ZrO_2$, $BaTiO_3$, $SnO_2$, $CeO_2$, $Y_2O_3$, $SiO_2$, silicon carbide (SiC), and boron nitride (BN).

In an exemplary embodiment of the present invention, the first insulating layer may further include an additional binder and inorganic particles in addition to the first binder, wherein the additional binder may be one or two or more mixtures selected from the group consisting of polyvinyl alcohol, polyethylene oxide, cellulose acetate, polyacrylonitrile, polyacrylate rubber, polymethacrylate, and polyvinyl acetate.

In an exemplary embodiment of the present invention, the second insulating layer may further include an additional binder in addition to the second binder, wherein the additional binder may be one or two or more mixtures selected from the group consisting of polyvinylidene fluoride copolymer, polyvinyl alcohol, polyethylene oxide, cellulose acetate, polyacrylonitrile, polyacrylate rubber, polymethacrylate, and polyvinyl acetate.

In an exemplary embodiment of the present invention, the first insulating layer may contain 20wt % to 99wt % of a binder.

In an exemplary embodiment of the present invention, the second insulating layer may contain 20wt % to 99wt % of a binder.

In an exemplary embodiment of the present invention, each thickness of the first insulating layer and the second insulating layer may be 1 μm to 15 μm.

A method for manufacturing an electrode for a lithium secondary battery according to an exemplary embodiment of the present invention includes: a step of preparing an insulating liquid for forming a first insulating layer by mixing a binder component containing a solvent and a first binder; a step of preparing an insulating liquid for forming a second insulating layer by mixing a binder component containing inorganic particles, a solvent, and a second binder; a step of applying a slurry for an electrode mixture containing an electrode active material on a current collector; and an insulating liquid applying step of applying the insulating liquid for forming the first insulating layer and the insulating liquid for forming the second insulating layer.

In an exemplary embodiment of the present invention, the insulating liquid applying step may include a process of applying the insulating liquid for forming the second insulating layer on the applying layer of the insulating liquid for forming the first insulating layer.

In an exemplary embodiment of the present invention, the insulating liquid applying step may apply the insulating liquid for forming the second insulating layer so that the surface of the insulating liquid for forming the first insulating layer is completely covered.

In an exemplary embodiment of the present invention, the viscosity of the insulating liquid for forming the first insulating layer and the insulating liquid for forming the second insulating layer may be 1,000 cps to 10,000 cps at 25° C., respectively.

In an exemplary embodiment of the present invention, the viscosity of the insulating liquid for forming the second insulating layer may be smaller than that of the insulating liquid for forming the first insulating layer.

In an exemplary embodiment of the present invention, the solvent of the insulating liquid for forming the first insulating layer and the solvent of the insulating liquid for forming the second insulating layer may be the same.

The lithium secondary battery according to the present invention includes the above-described electrode as a positive electrode or a negative electrode.

Advantageous Effects

In the electrode for the lithium secondary battery of the present invention, an insulating layer includes a first insulating layer having an excellent electrical safety and a second insulating layer having an excellent wetness adhesion, and by blocking or inhibiting the permeation of an electrolyte in the second insulating layer located in the upper layer into the first insulating layer located in the lower layer, it includes an insulating layer having an excellent electrical safety as well as an excellent wetness adhesion.

BRIEF DESCRIPTION OF THE DRAWINGS

FIG. 1 is a cross-sectional view of an electrode for a lithium secondary battery according to an exemplary embodiment of the present invention.

FIG. 2 is a cross-sectional view of an electrode for a lithium secondary battery according to another exemplary embodiment of the present invention.

FIG. 3 is a diagram showing a method of applying an insulating liquid for forming an insulating layer according to an exemplary embodiment of the present invention.

FIG. 4 is a diagram showing a method of applying an insulating liquid for forming an insulating layer according to another exemplary embodiment of the present invention.

BEST MODE FOR CARRYING OUT THE INVENTION

Hereinafter, preferred embodiments of the present invention will be described in detail with reference to the accompanying diagrams. Prior to this, the terms or the words used in this specification and claims should not be construed as being limited to the usual or dictionary meanings, and they should be interpreted as meanings and concepts consistent with the technological scope of the present invention based on the principle that the inventor appropriately uses the concept of the term in order to explain his/her invention in the best way.

Therefore, the embodiments described in this specification and the configurations shown in the diagrams are only one of the most preferred embodiments of the present invention, and do not represent all the technological scope of the present invention, so it should be understood that there may be various equivalents and modifications that can replace them at the time of this application.

The terms “comprise,” “include” or “have” are used herein to designate the presence of characteristics, numbers, steps, actions, components or members described in the specification or a combination thereof, and it should be understood that the possibility of the presence or addition of one or more other characteristics, numbers, steps, actions, components, members or a combination thereof is not excluded in advance.

Hereinafter, the present invention will be described in more detail.

<Electrode for Lithium Secondary Battery>

FIG. 1 is a cross-sectional view of an electrode for a lithium secondary battery according to an exemplary embodiment of the present invention, and referring to FIG. 1, the electrode for the lithium secondary battery of the present invention includes: a current collector 10; an electrode mixture layer 20 formed on one side or both sides of the current collector; and an insulating layer 30, wherein the insulating layer comprises a first insulating layer 31 including a first binder and second insulating layer 32 including inorganic particles and a second binder, wherein the first binder is PVDF (Polyvinylidene fluoride), and the second binder is SBR (styrene butadiene rubber).

The insulating layer of the present invention has a multilayer structure including a first insulating layer and a secondary insulating layer formed on the first insulating layer, and the first insulating layer includes PVDF having excellent electrical safety and coating processability as a first binder. In order to improve the problem of the first insulating layer in which the adhesive strength is lowered when wet with the electrolyte, the second insulating layer that blocks or inhibits the electrolyte wetting of the first insulating layer is applied on the first insulating layer, but the second insulating layer is characterized by including a second binder having an excellent wetness adhesion. Therefore, the insulating layer of the present invention has an excellent electrical safety as well as an excellent wetness adhesion.

In the electrode of the present invention, the current collector includes a non-coated part on which the electrode mixture layer is not formed, and the insulating layer is formed on the non-coated part on which the electrode mixture layer is not applied on the current collector, or it is formed to partially overlap the electrode mixture layer.

The first insulating layer is applied to cover from a part of the non-coated part to a part of the electrode mixture layer. Here, the length of the region where the first insulating layer overlaps the electrode mixture layer may be 0.05 mm to 5 mm, preferably 0.1 mm to 3.0 mm.

In order to prevent capacity degradation due to overlapping of the electrode mixture layer and the first insulating layer, the thickness of the first insulating layer in the region overlapping the electrode mixture layer may decrease toward the direction of the electrode mixture layer.

In addition, the second insulating layer is applied so as to cover from a part of the uncoated portion to a part of the electrode mixture layer.

FIG. 2 is a cross-sectional view of an electrode according to another embodiment of the present invention. Referring to FIG. 2, the surface of the first insulating layer 31 may be completely covered by the second insulating layer 32. That is, the second insulating layer overlaps a part of the current collector 10, all of the first insulating layer 31, and a part of the electrode mixture layer 20. Here, the overlapping length of the second insulating layer with the current collector is 0.05 mm to 5 mm, preferably 0.1 mm to 3.0 mm.

When the first insulating layer and the second insulating layer are formed in this structure, the first insulating layer is not exposed to the outside, so the second insulating layer can more fully express the function of a protective layer which blocks or inhibits the permeation of the electrolyte into the first insulating layer.

Since the second insulating layer serves to protect the first insulating layer from being wet with the electrolyte, it is preferable that the second insulating layer preferably has an excellent wetness adhesion.

Such second insulating layer includes inorganic particles and a second binder, and as the second binder, one or two or more may be selected from the group consisting of styrene-butadiene rubber, acrylate styrene-butadiene rubber, acrylonitrile-butadiene rubber, and acrylonitrile-butadiene-styrene rubber, and among them, styrene-butadiene rubber (SBR, hereinafter referred to as 'SBR') are most preferred.

The SBR contains styrene monomer-derived repeating units and butadiene monomer-derived repeating units in a weight ratio of 70:30 to 30:70, and contains styrene monomer-derived repeating units having a hydrophobic group within the above range, so that the wetness adhesion of the second insulating layer can be improved.

In addition, the total weight of the styrene monomer-derived repeating unit and the butadiene monomer-derived repeating unit based on the total weight of the styrene-butadiene-based rubber may be 30 to 100 wt % or 30 to 70 wt %, and when this range is satisfied, the wetness adhesion of the second insulating layer is appropriately controlled.

Examples of the styrene monomer include styrene, α-methyl styrene, p-methyl styrene, 3-methylstyrene, 4-methylstyrene, 4-propylstyrene, 1-vinylnaphthalene, 4-cyclohexylstyrene, 4-(p-methylphenyl) styrene, 1-vinyl-5-hexylnaphthalene, derivatives thereof, and mixtures thereof, and examples of the butadiene monomer include 1,3-butadiene, isoprene, 2,3-dimethyl-1,3-butadiene, 2-ethyl-1,3-butadiene, derivatives thereof, and mixtures thereof.

If necessary, the SBR may further contain a monomer-derived repeating unit having a cross-linkable group. At this time, the monomer-derived repeating unit having the cross-linkable group is preferably contained in an amount of 12 parts by weight or less based on the total weight of the SBR in order to reduce the electrolyte absorption rate.

In terms of adhesion to the electrode mixture layer, chemical resistance, and electrochemical stability, the first binder included in the first insulating layer is polyvinylidene fluoride (PVDF, hereinafter referred to as 'PVDF'). The PVDF includes a PVDF-based polymer containing vinylidene fluoride (VDF) as a monomer. Specific examples of the PVDF-based polymer include PVDF copolymers such as PVDF single polymer. PVDF-HFP (Poly (vinylidene fluoride-co-hexafluoropropylene)), PVDF-CTFE (Poly (vinylidene fluoride-co-chlorotrifluoroethylene)), PVDF-TFE (Poly (vinylidene tetrafluoroethylene)), PVDF-TrFE (Poly (vinylidene trifluoroethylene)), etc.

In terms of improving adhesion with the electrode mixture layer and securing a desired viscosity, the PVDF may have a weight average molecular weight of 400,000 to 1,500,000, preferably 600,000 to 1,200,000.

Due to its electrochemical stability, the PVDF binder included in the first insulating layer does not cause side reactions even when charged and discharged for a long period of time at a voltage level of 4V to 5V, and while it maintains the molecular structure well, there is a possibility of being deintercalated from the current collector and the electrode mixture layer because the wetness adhesion is lowered by the electrolyte. The SBR, a binder included in the second insulating laver, has an excellent wetness adhesion, but when charged and discharged for a long time at a voltage level of 4V to 5V, it can be decomposed due to the oxidation reaction of butadiene in the SBR. Such oxidation reaction can be alleviated by the PVDF included in the first insulating layer, and even if the oxidation reaction proceeds, since the first insulating layer is remained, the insulating property of the insulating layer can be maintained.

The first insulating layer may further include an additional binder in addition to the first binder. In this case, specific examples of the additional binder are one or two or more mixtures selected from the group consisting of polyvinyl alcohol, polyethylene oxide, cellulose acetate, polyacrylonitrile, polyacrylate rubber, polymethacrylate, and polyvinyl acetate.

The second insulating layer may further include an additional binder in addition to the second binder. In this case, specific examples of the additional binder are one or two or more mixtures selected from the group consisting of polyvinylidene fluoride copolymer, polyvinyl alcohol, polyethylene oxide, cellulose acetate, polyacrylonitrile, polyacrylate rubber, polymethacrylate, and polyvinyl acetate.

By including such an additional binder in the first insulating layer and the second insulating layer, respectively, it is possible to compensate for the disadvantages of the PVDF and SBR.

Each of the first insulating layer and the second insulating layer may further include inorganic particles, and the inorganic particles may improve the safety of the battery and also improve the solidity of the insulating layer. The content of the inorganic particles may be appropriately adjusted in consideration of the viscosity, heat resistance, insulation, filling effect, dispersibility or stability of the insulating liquid for forming the insulating layer. In general, as the diameter of the inorganic particles increases, the viscosity of the insulating liquid including them increases, and the possibility of precipitation in the insulating liquid increases. In addition, the smaller the diameter of the inorganic particles, the higher the thermal resistance. Therefore, considering the above points, inorganic particles of an appropriate type and size may be selected, and if necessary, two or more types of inorganic particles may be used together.

In a specific example, the inorganic particles may be one or two or more mixtures selected from the group consisting of AlOOH, $Al_2O_3$, γ-AlOOH, $Al(OH)_3$, $Mg(OH)_2$, $Ti(OH)_4$, $TiO_2$, MgO, CaO, $Cr_2O_3$, $MnO_2$, $Fe_2O_3$, $CoO_4$, NiO, $ZrO_2$, $BaTiO_3$, $SnO_2$, $CeO_2$, $Y_2O_3$, $SiO_2$, silicon carbide (SiC), and boron nitride (BN).

Each of the first insulating layer and the second insulating layer may contain up to 60 wt % of the inorganic particles, preferably 5 wt % to 55 wt %, more preferably 5 wt % to 50 wt % can be included.

In a specific example, the first insulating layer may include 20 wt % to 99 wt % of a binder, and the second insulating layer may include 20 wt % to 99 wt % of a binder.

In a specific example, each thickness of the first insulating layer and the second insulating layer is 1 μm to 15 μm, preferably 2 μm to 13 μm, and more preferably 3 μm to 12 μm.

In the second insulating layer, the weight ratio of the inorganic particles and SBR may be in the range of 1:99 to 95:5, 10:90 to 70:30, and 20:80 to 50:50. When the above range is satisfied, it is advantageous in terms of adhesion between inorganic particles, adhesion between the insulating layer and current collector, and a desired insulating effect.

The electrode may be a positive electrode or a negative electrode, and accordingly, the electrode mixture layer may be a positive electrode mixture layer containing a positive electrode active material or a negative electrode mixture layer containing a negative electrode active material.

The positive electrode is prepared by applying and drying a mixture of a positive electrode active material, a conductor, and a binder on a positive electrode current collector. If necessary, a filler may be further added to the mixture.

The positive electrode current collector is generally made to have a thickness of 3 to 500 μm. The positive electrode current collector is not particularly limited as long as it does not cause chemical change in the battery and has high conductivity. For example, stainless steel, aluminum, nickel, titanium, fired carbon, or an aluminum or a stainless steel in which a surface is treated with carbon, nickel, titanium, silver, or the like may be used. The current collector may form a micro/nano-scaled unevenness on its surface to increase the adhesion of the positive electrode active material, and may have various forms such as films, sheets, foils, nets, porous bodies, foams, and non-woven fabrics.

The positive electrode active material may include a layered compound such as lithium cobalt oxide ($LiCoO_2$), lithium nickel oxide ($LiNiO_2$), etc. or a compound substituted with one or more transition metals; lithium manganese oxides such as chemical formula $Li_{1+x}Mn_{2-x}O_4$ (where x is 0 to 0.33), $LiMnO_3$, $LiMn_2O_3$, and $LiMnO_2$; lithium copper oxides ($Li_2Mn_3MO_2$); vanadium oxides such as $LiV_3O_8$, $LiFe_3O_4$, $V_2O_5$, $Cu_2V_2O_7$; Ni-site-type lithium nickel oxides represented by the chemical formula $LiNi_{1-x}M_xO_2$ (where M=Co, Mn, Al, Cu, Fe, Mg, B or Ga, and x=0.01 to 0.3); lithium manganese composite oxides represented by the formula $LiMn_{2-x}M_xO_2$ (where M=Co, Ni, Fe, Cr, Zn or Ta and x=0.01 to 0.1) or $Li_2Mn_3MO_8$ (where M=Fe, Co, Ni, Cu or Zn); $LiMn_2O_4$ in which a part of Li in the formula is substituted with an alkaline earth metal ion; disulfide compounds; $Fe_2(MoO_4)_3$, etc., but is not limited thereto.

The negative electrode is prepared by applying and drying the negative electrode material on the negative electrode current collector, and if necessary, the components described above may be further included.

The negative electrode current collector is generally made to have a thickness of 3 to 500 μm. The negative electrode current collector is not particularly limited as long as it has conductivity without causing chemical change to the battery, and for example, copper, stainless steel, aluminum, nickel, titanium, calcined carbon, or copper or stainless steel in which a surface is treated with carbon, nickel, titanium, silver, or the like, an aluminum-cadmium alloy, etc. may be used. In addition, as the same manner as the positive electrode current collector, a micro/nano-scaled unevenness may be formed on the surface to enhance the adhesion of the negative electrode active material, and may be used in various forms such films, sheets, foils, nets, porous bodies, foams, and non-woven fabrics.

In a specific example, the negative electrode active material may include carbons such as non-graphitizable carbon and graphite-based carbon; metal complex oxides such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb, Ge; Me': Al, B, P, Si, group 1, group 2, and group 3 elements of the periodic table, halogens; $0 < x \le 1$; $1 \le y \le 3$; $1 \le z \le 8$); lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_5$, etc.; conductive polymers such as polyacetylene; Li—Co—Ni-based materials, or the like.

The conductor is typically added in an amount of 1 to 50 wt % based on the total weight of the mixture including the positive electrode active material, Such a conductor is not particularly limited as long as it has conductivity without causing chemical change in the battery, and examples thereof include graphites such as natural graphite or artificial graphite; carbon blacks such as carbon black, acetylene black, ketjen black, channel black, furnace black, lamp black, and summer black; conductive fibers such as carbon fibers and metal fibers; metal powders such as carbon fluoride, aluminum, and nickel powder; conductive whiskeys such as zinc oxide and potassium titanate; conductive metal oxides such as titanium oxide; conductive materials such as polyphenylene derivatives, etc.

The binder is a component that assists in coupling of the active material with the conductive material and coupling to the current collector, and is typically added in an amount of 1 to 50 wt % based on the total weight of the mixture including the positive electrode active material. Examples of such binders include poly vinylidene fluoride, polyvinyl alcohol, carboxymethylcellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene-butylene rubber, fluoro-rubber, various copolymers, and the like.

<Method for Manufacturing Electrode for Lithium Secondary Battery>

A method of manufacturing an electrode for a lithium secondary battery according to the present invention includes: preparing an insulating liquid for forming a first insulating layer by mixing a solvent and a binder component including a first binder; preparing an insulating liquid for forming a second insulating layer by mixing a binder component including inorganic particles, a solvent, and a second binder; applying a slurry for an electrode mixture containing an electrode active material on a current collector; and an insulating liquid applying step of applying the insulating liquid for forming the first insulating layer and the insulating liquid for forming the second insulating layer.

Preparing the insulating liquid for forming the first insulating layer is a step of preparing the insulating liquid for forming the insulating layer by mixing PVDF to the solvent as a first binder. Preparing the insulating liquid for forming the second insulating layer is a step of preparing the insulating liquid for forming the insulating layer by mixing SBR as a second binder and inorganic particles to a solvent.

Solvents used in the insulating liquid for forming the first insulating layer and the insulating liquid for forming the second insulating layer may include water; alcohols such as methanol, ethanol, propanol, and butanol; ketones such as acetone and phenylethyl ketone; ethers such as methyl ethyl ether, diethyl ether, and diisoamyl ether; lactones such as gamma-butyrolactone; N-methyl-2-pyrrolidone (NMP); lactams such as beta-lactam; cyclic aliphatic groups such as cyclopentane and cyclohexane; aromatic hydrocarbons such as benzene and toluene; esters such as methyl lactate and ethyl lactate, and the like. Among these, N-methyl-2-pyrrolidone (NMP), which has a similarity to conventional slurries for positive electrode mixtures, can be suitably used. The content of the solvent is not particularly limited, but is determined in consideration of dispersibility of inorganic particles, ease of coating, drying time, etc.

Applying the slurry for electrode mixture includes forming an undried electrode mixture layer by applying the slurry composition for the electrode mixture on an electrode current collector. The electrode current collector may be used in the same type, material, thickness, and the like as the electrode current collector described above.

The slurry composition for the electrode mixture may be applied on the electrode current collector to form the undried electrode mixture layer.

For example, an electrode mixture layer may be formed after the undried electrode mixture layer is simultaneously dried with an undried insulating layer to be described later.

The slurry composition for the electrode mixture may be a slurry composition for a positive electrode mixture or a slurry composition for a negative electrode mixture, preferably a slurry composition for the positive electrode mixture.

The slurry composition for the positive electrode mixture may include a binder and/or a conductor for the positive electrode mixture, and the slurry composition for the negative electrode mixture may include a binder and/or a conductor for the negative electrode mixture. For the binder and/or the conductor for the positive electrode mixture, the negative electrode mixture, the aforementioned binder and/or conductor for positive electrode mixture, negative electrode mixture may be used.

The slurry composition for mixture may be applied on the electrode current collector to form an undried electrode mixture layer. In the present specification, "undried" covers both the case where the slurry composition for a mixture is not dried after application and the case where it is not substantially dried because a drying process is not performed.

In an embodiment of the present invention, the insulating layer is formed by forming the electrode mixture layer by applying and drying the electrode mixture slurry containing the electrode active material on the electrode current collector, and then applying and drying the insulating liquid for forming the insulating layer on the non-coated part of the electrode current collector.

As a coating method for forming the insulating layer, dipping, spray coating, spin coating, roll coating, die coating, gravure printing, bar coating, etc. may be performed, but is not limited thereto, and preferably, die coating and gravure printing methods may be used.

The step of applying the insulating liquid includes forming an undried insulating layer by applying the aforementioned insulating liquid so that it overlaps with the undried electrode active material layer in a partial region.

In addition, the step of applying the insulating liquid may be performed by applying the insulating liquid for forming the second insulating layer on top of an application portion of the insulating liquid for forming the first insulating layer.

FIG. 3 shows a method of forming an insulating layer according to an exemplary , embodiment of the present invention. Referring to FIG. 3, in one specific example, the insulating layer of the present invention can be formed by using two single die cowers 210, 220. In one single die coater 210, the insulating liquid 31 for forming the first insulating layer is discharged. In the other single die coater 220, the insulating liquid 32 for forming the second insulating layer is discharged, and the insulating liquid for forming the second insulating layer is discharged at the upper part of the insulating liquid for forming the first insulating layer.

FIG. 4 shows a method of forming an insulating layer according to another exemplary embodiment of the present invention. Referring to FIG. 4, by using a dual die coater 300, the insulating liquid 31 for forming the first insulating layer and the insulating liquid 32 for forming the second insulating layer are discharged from two slits, respectively, so that the first insulating layer and the second insulating layer can be formed at the same time, thereby simplifying the insulating layer application process and improving productivity.

At this time, it is desirable to apply the insulating liquid so that the surface of the insulating liquid for forming the first insulating layer is completely covered by the insulating liquid for forming the second insulating layer in order to prevent the electrolyte from welling the first insulating layer.

The insulating liquid for forming the first insulating layer and the insulating liquid for forming the second insulating layer have viscosities of 1,000 cps to 10,000 cps at 25° C., respectively.

In a specific example, in order for the insulating liquid to have the second insulating layer completely cover the application portion of the insulating liquid for forming the first insulating layer, the viscosity of the insulating liquid for forming the second insulating layer can be adjusted to a smaller range than that of the viscosity of the insulating liquid for forming the first insulating layer.

Each application thickness of the insulating liquid for forming the first insulating layer and the insulating liquid for forming the second insulating layer is 1 μm to 15 μm, preferably 2 μm to 14 m, and more preferably 3 μm to 12 μm. If the application thickness of the insulating liquid for forming the insulating layer is too thin, it is difficult to expect an insulating effect, and if the thickness is too thick, the volume of e electrode tab becomes unnecessarily large, which is not preferable.

Since the binder and the inorganic particles included in the first insulating layer and the second insulating layer have been described in detail above, further descriptions are omitted.

<Lithium Secondary Battery>

The lithium secondary battery according to the present invention includes an electrode including the above-described first insulating layer and the second insulating layer as a positive electrode or a negative electrode.

The lithium secondary battery specifically includes a positive electrode, a negative electrode facing the positive electrode, a separator interposed between the positive electrode and the negative electrode, and an electrolyte. In this case, the positive electrode and/or the negative electrode may be the electrode for the lithium secondary battery described above. In addition, the lithium secondary battery may optionally further include a battery container accommodating an electrode assembly of the positive electrode, the negative electrode, and the separator, and a sealing member sealing the battery container.

Meanwhile, in the lithium secondary battery, the separator separates the negative electrode and the positive electrode and provides a passage for lithium-ion movement, and any separator used as a separator in a conventional lithium secondary battery can be used without particular limitation, and especially those having low resistance to the movement of ions in the electrolyte and excellent ability to absorb the electrolyte are preferable. Specifically, a porous polymer film, for example, a porous polymer film made of polyolefin-based polymers such as ethylene homopolymer, propylene homopolymer, ethylene/butene copolymer, ethylene/hexene copolymer, and ethylene/methacrylate copolymer, or a laminated structure of two or more layers thereof may be used. In addition, conventional porous non-woven fabrics, for example, non-woven fabrics made of high-melting glass fibers, polyethylene terephthalate fibers, and the like may be used. In addition, a coated separator containing a ceramic component or a polymer material may be used to secure heat resistance or mechanical strength, and it may be selectively used in a single layer or a multilayer structure.

in addition, the electrolyte used in the present invention includes organic liquid electrolytes, inorganic liquid electrolytes, solid polymer electrolytes, gel polymer electrolytes, solid inorganic electrolytes, and molten inorganic electrolytes that can be used in manufacturing lithium secondary batteries, but is not limited thereto.

Specifically, the electrolyte may include an organic solvent and a lithium salt.

Hereinafter, the present invention will be described in detail through exemplary embodiments and the like. However, the configurations described in the exemplary embodiments described in this specification are only one embodiment of the present invention and do not represent all the technological scope of the present invention, so it should be understood that there may be various equivalents and modifications that can substitute them at the time of this application.

The organic solvent may be used without particular limitation as long as it can serve as a medium through which ions involved in the electrochemical reaction of the battery can move. Specifically, the organic solvent includes ester-based solvents such as methyl acetate, ethyl acetate, γ-butyrolactone, and ε-caprolactone; ether solvents such as dibutyl ether or tetrahydrofuran; ketone solvents such as cyclohexanone; aromatic hydrocarbon-based solvents such as benzene and fluorobenzene; carbonate-based solvents such as ditmethylcarbonate (DMC), diethylcarbonate (DEC), methylethylcarbonate (MEC), ethylmethylcarbonate (EMC), ethylenecarbonate (EC), and propylene carbonate (PC); alcoholic solvents such as ethyl alcohol and isopropyl alcohol; nitriles such as R—CN (R is a straight-chain, branched or cyclic hydrocarbon group having 2 to 20 carbon atoms, and may include a double-bonded directional ring or an ether bond); amides such as dimethylformamide; dioxolanes such as 1,3-dioxolane; or sulfolanes, and the like. Among them, carbonate-based solvents are preferred, and cyclic carbonates (e.g., ethylene carbonate or propylene carbonate, etc.) having high ion conductivity and high dielectric constant capable of increasing the charge and discharge performance of batteries, and a mixture of low-viscosity linear carbonate-based compounds (e.g., ethyl methyl carbonate, dimethyl carbonate, or diethyl carbonate, etc.) is more preferable. In this case, the performance of the electrolyte may be excellent when the cyclic carbonate and the chain carbonate are mixed in a volume ratio of about 1:1 to about 1:9.

The lithium salt may be used without particular limitation as long as it is a compound capable of providing lithium ions used in a lithium secondary battery. Specifically, the lithium salt may include $LiPF_6$, $LiClO_4$, $LiAsF_6$, $LiBF_4$, $LiSbF_6$, $LiAlO_4$, $LiAlO_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ and the like. The concentration of the lithium salt is preferably used within the range of 0.1 to 2.0M. When the concentration of the lithium salt is within the above range, the electrolyte has appropriate conductivity and viscosity, so excellent electrolyte performance can be exhibited, and lithium ions can move effectively.

Besides the components of the electrolyte, the electrolyte may further include, for example, haloalkylene carbonate-based compounds such as difluoro ethylene carbonate, and one or more additives such as pyridines, triethyl phosphites, triethanolamines, cyclic ethers, ethylene diamines, n-glymes, hexaphosphoric acid triamides, nitrobenzene derivatives, sulfurs, quinone imine dyes, N-substituted oxazolidinones, N,N-substituted imidazolidines, ethylene glycol dialkyl ethers, ammonium salts, pyrroles, 2-methoxyethanols, or aluminum trichlorides for the purpose of improving life characteristics of a battery, suppressing battery capacity decrease, improving battery discharge capacity, etc. In this case, the additive may be included in an amount of 0.1 to 5 wt % based on the total weight of the electrolyte.

The lithium secondary battery according to the embodiments is useful for portable devices such as mobile phones, laptops, and digital cameras, and electric vehicles such as hybrid electric vehicles (HEVs).

Accordingly, according to another embodiment of the present invention, a battery module including the lithium secondary battery as a unit cell and a battery pack including the same are provided.

The battery module or the battery pack may be used as a power supply for one or more medium or large devices such as power tools Electric Vehicles (EVs), electric vehicles including hybrid electric vehicles and plug-in hybrid electric vehicles (PHEVs); or power storage systems.

The shape of the lithium secondary battery of the present invention is not particularly limited, but may be cylindrical, prismatic, pouch, or coin-type that uses a can.

The lithium secondary battery according to the present invention can not only be used in a battery cell used as a power source for small devices, but it can also be preferably used as a unit cell in a medium or large-sized battery module including a plurality of battery cells.

Hereinafter, the present invention will be described in more detail by Examples and Experimental Examples.

However, the following Examples and the Experimental Examples are merely exemplifying the present invention, and the content of the present invention is not limited to the following Examples and the Experimental Examples.

EXAMPLE: PREPARATION OF INSULATING LIQUID FOR FORMING INSULATING LAYER

Preparation of Insulating Liquid for Forming First Insulating Layer

To a N-methyl-2-pyrrolidone (NMP) solvent, PVDF (product name: KF9700, manufacturer: Kureha, weight average molecular weight: 880,000) as a first binder and AlOOH as inorganic particles were added and stirred. Here, the weight ratio of the first binder to the inorganic particles was 60:40.

Preparation of Insulating Liquid for Forming Second Insulating Layer

To a water solvent, commercially available SBR as a second binder and AlOOH as inorganic particles were added and stirred. Here, the weight ratio of the second binder to the inorganic particles was 60:40.

Comparative Example: Preparation of Insulating Liquid for Forming Insulating Layer An insulating liquid for forming an insulating layer prepared in the same manner as the insulating liquid for forming the first insulating layer in the above embodiment was prepared.

Experimental Example 1: Measurement of Wet Adhesion

In order to evaluate the wetness adhesion of the insulating layer according to the present invention, the following experiment was performed.

Preparation of Specimen Having Insulating Layer

An aluminum metal foil having a thickness of 15 μm was coated with the insulating liquid for forming the first insulating layer and the insulating liquid for forming the second insulating layer so that they are stacked in order, and then it was dried to prepare a specimen. Each thickness of the first insulating layer and the second insulating layer of the specimen was 5 μm. The metal specimen of the Example in which the insulating layer was formed was punched into a size of 2 cm×2 cm using a punching machine for measuring adhesion.

Specimens were prepared in the same manner as above for the Comparative Example.

Ultrasonic Wave Application 200 g of electrolyte EC/EMC=3/7 (vol. %) was put into a 250 ml beaker, and each specimen of the Example and Comparative Example having an insulating layer was impregnated with the electrolyte. In order to control the movement of the specimen, the specimen was fixed with a jig.

Then, ultrasonic waves were applied to the electrolyte in which the specimen was impregnated using an ultrasonic disperser (BANDELIN Co., 4200). Here, the conditions for the ultrasonic wave application are as follows.

Frequency: 20 kHz
Tip diameter: 13 mm (TS-113)
Amplitude: 100%
(Peak-to-Peak 132 μm When Using 13 mm Tip)

Thereafter, ultrasonic waves were applied until the temperature of the electrolyte reached 109° C., and whether or not the insulating layer was deintercalated from the specimen was visually checked and the results were shown in Table 1.

TABLE 1

| Category | Example | Comparative Example |
|---|---|---|
| Comparison of Wetness Adhesion | No deintercalation | Intercalation occurred |

As shown in Table 1, the insulating layer was not deintercalated from the specimen of the Example, but the insulating layer was deintercalated from the specimen of Comparative Example 1. Therefore, it can be confirmed that the electrode according to the present invention has an excellent wetness adhesion due to the existence of the second insulating layer.

The invention claimed is:

1. An electrode for a lithium secondary battery, comprising:

a current collector;

an electrode mixture layer disposed on one side or both sides of the current collector; and an insulating layer, wherein the insulating layer comprises a first insulating layer comprising a first binder and a second insulating layer disposed on the first insulating layer and comprising inorganic particles and a second binder, wherein the first binder comprises polyvinylidene fluoride (PVDF), the second binder comprises styrene butadiene rubber (SBR), the second insulating layer is disposed on the first insulating layer to completely cover an exposed portion of the first insulating layer, and the second insulating layer is not disposed on a top surface of the electrode mixture layer.

2. The electrode for the lithium secondary battery of claim 1, wherein the current collector comprises a non-coated part on which the electrode mixture layer is not formed, and the first insulating layer disposed on the non-coated part the current collector and the electrode mixture layer.

3. The electrode for the lithium secondary battery of claim 2, wherein the second insulating layer disposed on the non-coated part of the current collector and the electrode mixture layer.

4. The electrode for the lithium secondary battery of claim 1, wherein the inorganic particles comprise one or more chosen from AlOOH, $Al_2O_3$, γ-AlOOH, $Al(OH)_3$, $Mg(OH)_2$, $Ti(OH)_4$, $TiO_2$, MgO, CaO, $Cr_2O_3$, $MnO_2$, $Fe_2O_3$, $CoO_4$, NiO, $ZrO_2$, $BaTiO_3$, $SnO_2$, $CeO_2$, $Y_2O_3$, $SiO_2$, silicon carbide (SiC), and boron nitride (BN).

5. The electrode for the lithium secondary battery of claim 1, wherein the first insulating layer further comprises an additional binder and second inorganic particles in addition to the first binder, wherein the additional binder comprises one or more chosen from polyvinyl alcohol, polyethylene oxide, cellulose acetate, polyacrylonitrile, polyacrylate rubber, polymethacrylate, and polyvinyl acetate.

6. The electrode for the lithium secondary battery of claim 1, wherein the second insulating layer further comprises an additional binder in addition to the second binder, wherein the additional binder comprises one or more chosen from polyvinylidene fluoride copolymer, polyvinyl alcohol, polyethylene oxide, cellulose acetate, polyacrylonitrile, polyacrylate rubber, polymethacrylate, and polyvinyl acetate.

7. The electrode for the lithium secondary battery of claim 5, wherein the first insulating layer contains 20 wt % to 99 wt % of the first binder with respect 100 wt % of the first insulating layer.

8. The electrode for the lithium secondary battery of claim 6, wherein the second insulating layer contains 20 wt % to 99 wt % of the second binder with respect to 100 wt % of the second insulating layer.

9. The electrode for the lithium secondary battery of claim 1, wherein each thickness of the first insulating layer and the second insulating layer is 1 μm to 15 μm.

10. A method for manufacturing an electrode for a lithium secondary battery, comprising:

preparing an insulating liquid for forming a first insulating layer by mixing a binder component containing a solvent and a first binder;

preparing an insulating liquid for forming a second insulating layer by mixing a binder component containing inorganic particles, a solvent, and a second binder;

applying a slurry for an electrode mixture containing an electrode active material on a current collector;

applying the insulating liquid for forming the first insulating layer; and applying the insulating liquid for forming the second insulating layer so that a surface of the first insulating layer is completely covered and the second insulating layer is not disposed on a top surface of the electrode mixture layer.

11. The method for manufacturing the electrode for the lithium secondary battery of claim 10, wherein the applying the insulating liquid for forming the second insulating layer comprises applying the insulating liquid for forming the second insulating layer on the first insulating layer.

12. The method for manufacturing the electrode for the lithium secondary battery of claim 11, wherein the applying the insulating liquid for forming the second insulating layer comprises applying the insulating liquid for forming the second insulating layer on the first insulating layer.

13. The method for manufacturing the electrode for the lithium secondary battery of claim 11, wherein each viscosity of the insulating liquid for forming the first insulating layer and the insulating liquid for forming the second insulating layer is 1,000 cps to 10,000 cps at 25° C., respectively.

14. The method for manufacturing the electrode for the lithium secondary battery of claim 13, wherein the viscosity of the insulating liquid for forming the second insulating layer is smaller than the viscosity of the insulating liquid for forming the first insulating layer.

15. The method for manufacturing the electrode for the lithium secondary battery of claim 10, wherein a solvent of the insulating liquid for forming the first insulating layer and a solvent of the insulating liquid for forming the second insulating layer are the same.

16. A lithium secondary battery comprising the electrode according to claim 1 as a positive electrode or a negative electrode.

* * * * *